United States Patent [19]

Vogel

[11] Patent Number: 4,714,963
[45] Date of Patent: Dec. 22, 1987

[54] ASYNCHRONOUS STILL TIMING FOR A VIDEO CAMERA PRODUCING MOVIE OR STILL IMAGES

[75] Inventor: Richard M. Vogel, Rochester, N.Y.

[73] Assignee: Eastman Kodak Company, Rochester, N.Y.

[21] Appl. No.: 882,121

[22] Filed: Jul. 3, 1986

[51] Int. Cl.$^4$ .............................................. H04N 3/14
[52] U.S. Cl. ........................... 358/213.26; 358/213.31; 358/909
[58] Field of Search .............. 358/909, 213.31, 213.26, 358/213.19, 335, 228

[56] References Cited

U.S. PATENT DOCUMENTS

| | | | |
|---|---|---|---|
| 4,322,753 | 3/1982 | Ishihara | 358/213 |
| 4,363,034 | 12/1982 | Grancoin et al. | 358/213 |
| 4,382,267 | 5/1983 | Angle | 358/213 |
| 4,456,931 | 6/1984 | Toyoda et al. | 358/335 |
| 4,479,062 | 10/1984 | Kawasaki et al. | 250/578 |
| 4,496,980 | 1/1985 | Pfleiderer et al. | 358/212 |
| 4,504,866 | 3/1985 | Saito | 358/213 |
| 4,532,550 | 7/1985 | Bendell et al. | 358/213 |
| 4,541,016 | 9/1986 | Ochi et al. | 358/909 |
| 4,547,676 | 10/1985 | Suzuki et al. | 250/578 |
| 4,556,912 | 12/1985 | Yamanaka et al. | 358/909 |
| 4,563,708 | 7/1986 | Ishibashi | 358/213 |
| 4,597,014 | 6/1986 | Suzuki | 358/909 |
| 4,622,596 | 11/1986 | Sega et al. | 358/909 |
| 4,631,593 | 12/1986 | Kinoshita et al. | 358/909 |
| 4,663,669 | 5/1987 | Kinoshita et al. | 358/213.26 |

*Primary Examiner*—Gene Z. Rubinson
*Assistant Examiner*—Stephen Brinich
*Attorney, Agent, or Firm*—David M. Woods

[57] ABSTRACT

A still video camera produces a movie image for previewing in an electronic viewfinder according to a specific image repetition rate and a still image for recording on a magnetic disk. In the movie mode, video signals are clocked from a solid-state, interline transfer image sensor by application of driving signals from a movie timing generator. The still mode interrupts the movie timing with a special driving signal from a still timing generator. By initiating the still exposure in synchronism with the high frequency movie driving signals that operate the image sensor . . . and not with regard to the vertical drive interval determining the image repetition rate . . . a "pseudo"-asynchronous relationship can be obtained with the movie mode and the still exposure can begin without noticeable delay. After the still exposure is completed, control of the image sensor is returned to the movie timing generator in synchronism with the image repetition rate.

11 Claims, 9 Drawing Figures

ASYNCHRONOUS STILL TIMING FOR A VIDEO CAMERA PRODUCING MOVIE OR STILL IMAGES

CROSS REFERENCE TO A RELATED APPLICATION

This application is related to copending patent application Ser. No. 880,461, entitled "Exposure Control Apparatus for a Still Video Camera Having an Electronic Viewfinder", filed in the names of T. Nutting and R. Shroyer on June 30, 1986.

BACKGROUND OF THE INVENTION

1. Field of the Invention

The present invention relates to the field of still video imaging, and especially to the timing and control circuits of an image sensor for a still video camera of the type that produces a movie image in addition to a still image.

2. Description Relative to the Prior Art

A still video camera, by virtue of its inherent video processing capability, is well suited for combination with an electronic viewfinder (see, for example, the camera disclosed in U.S. Pat. No. 4,456,931). This combination is particularly advantageous for previewing the picture as it will actually appear subsequent to video processing. Such a camera operates in two modes: a movie mode for producing a moving video image in the viewfinder and a still mode for producing and recording a still image. The movie mode is comparable to the operation of any motion picture video camera. In such a camera, the photosensitive region of an image sensor is continuously irradiated by scene light. Since the exposure time is fixed to accord with the video image rate (e.g., 1/30th second), the image sensor is repetitively processed at a corresponding image frequency (e.g., 30 frames/second).

In the still mode, it is desirable that the exposure time is controlled so as to vary the length of time the image sensor is exposed to light. The image sensor must therefore be processed, not repetitively, but only once in a manner that defines the required exposure time and produces a video signal corresponding to the exposed image. Since a common image sensor is preferably the signal source for both modes, one mode excludes the other, that is, the movie mode can only precede, or follow, the still mode. This fact of operation leads to the conventional timing sequence in a still video camera. For instance, in U.S. Pat. No. 4,456,931, a control circuit is disclosed which either provides one set of drive signals to the image sensor when the monitor (viewfinder) displays the image focused on the image sensor or another set of drive signals to initiate and process the still exposure. Though not showing an electronic viewfinder like that shown in the preceding patent, U.S. Pat. No. 4,541,016 discloses a full-frame image pickup device that is synchronized, in its still operation, to a continuously running vertical drive signal. Since the charge storage period of each field is treated independently of the other, this disclosure suggests that a solid state image pickup unit equipped for still image pickup could also provide moving image pickup like an ordinary video camera.

Despite such suggestions from the prior art, it is not a trivial matter to incorporate movie timing with still timing. Substituting one set of drive signals . . . the still drive signals . . . for another set of drive signals . . . the movie drive signals . . . is not a totally asynchronous operation, as might be implied in U.S. Pat. No. 4,456,931. If for no other reason than cost, duplication of timing circuits is preferably avoided. More importantly, the two sets of drive signals must be tied together for the system to make a smooth transition from movie to still and back. On the other hand, if the still drive signals are totally synchronous with the vertical drive signal, as is the case in U.S. Pat. No. 4,541,016, the still exposure must occur in lockstep with the moving image pickup function. This is unfortunate in that the desired beginning of a still exposure seldom coincides with the beginning of the vertical drive interval. Some delay, i.e., up to 1/60 second, could thus be encountered before actually beginning the still exposure.

SUMMARY OF THE INVENTION

By initiating the still exposure in synchronism with the high frequency driving signals that operate an image sensor . . . instead of the vertical drive signal . . . a "pseudo"-asynchronous relationship can be obtained with the movie mode. True, the beginning of the still exposure is still in "lockstep" with a repetitive signal, but now with a signal that repeats in terms of nanoseconds (or microseconds), instead of milliseconds. The initiation of the still exposure thus becomes in effect "substantially" or "pseudo" asynchronous with respect to the image repetition frequency that governs the movie mode. The beginning of the still mode, i.e., the still exposure, becomes in a practical sense independent of the movie mode. Though the movie mode in the preferred embodiment is connected with the use of an electronic viewfinder, the invention relates more generally to the integration of a still exposure with any type of movie function, including the exposure and the recording of video movie images.

A still video camera according to the invention includes a signal generator for generating a continuous stream of imager driving signals for operating the image sensor according to a specific image repetition rate. A transfer circuit applies these imager driving signals to the image sensor when the image sensor operates as a signal source for a movie image. A still driving signal is also generated for operating the image sensor as a signal source for a still image. When an exposure release switch (for a still exposure) is actuated, the application of the imager driving signals to the image sensor is interrupted and the still signal is substituted therefor in synchronism with the imager driving signals.

BRIEF DESCRIPTION OF THE DRAWINGS

The invention will be described with reference to the drawings, in which.

DESCRIPTION OF THE PREFERRED EMBODIMENT

Because video cameras and video cameras employing electronic viewfinders are well known, the present description will be directed in particular to elements forming part of, or cooperating more directly with, apparatus in accordance with the present invention. Elements not specifically shown or described herein may be selected from those known in the art.

Figure 1:
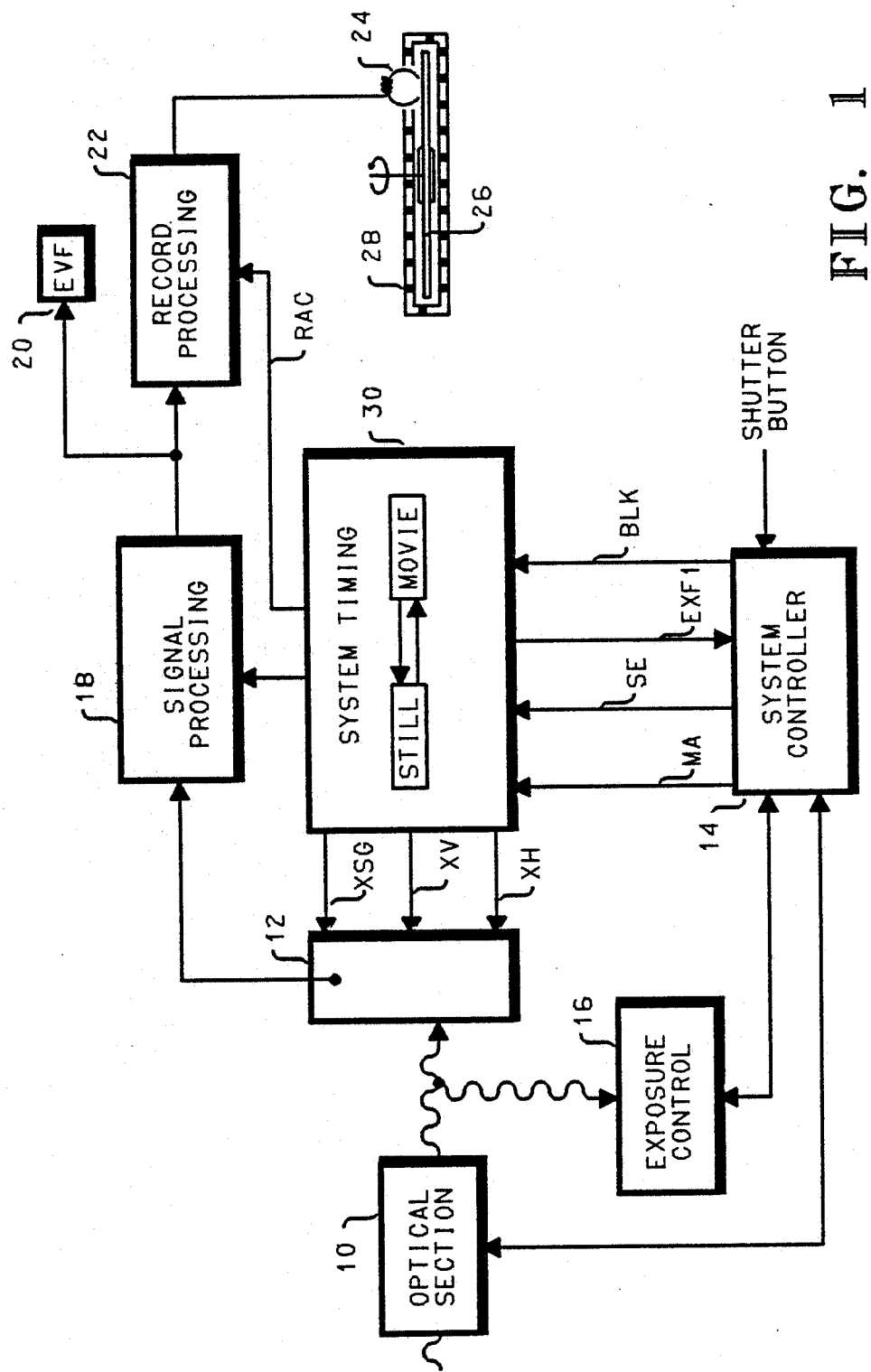
FIG. 1 is a block diagram of a still video camera incorporating a timing and control circuit according to the invention.

Referring initially to FIG. 1, the pertinent sections of a still video camera are shown for purposes of describing the invention: An optical section 10 directs image light to an image sensor 12, which in its preferred form is a conventional solid-state, interline-transfer image sensor. The basic elements of a conventional interline-transfer image sensor are shown schematically in an abbreviated form in FIG. 2. Briefly, the light gathered by the optical section 10 causes charge to collect in an array of photosites according to the pattern of the image. A group of imager driving signals (XSG, XV and SH) determine the operation of the sensor—in the case of a charge-coupled device, certain of these signals (XV and XH) prescribe a phase-related control of charge movement, hence the term phasing signals. When a transfer gate signal XSG is low, the image charge packets that have collected in the photosites transfer through a set of transfer gates to a corresponding set of vertical charge-coupled (CCD) shift registers. There a set of vertical phasing signals XV1 ... XV4 transfer the charge packets to a horizontal CCD shift register, from which they are transferred off the image sensor by a horizontal phasing signal XH. Vertical and horizontal transfers are accomplished by biasing the registers with the respective phasing signals to form an array of independent potential wells, which are then shifted by varying the bias levels of the phasing signals in tandem.

Referring back to FIG. 1, a system controller 14, preferably a microprocessor, controls the general operation of the camera, including the optical section 10 and an exposure control circuit 16. A video signal generated by the image sensor 12 is converted into a line sequential color signal by a signal processing section 18. A monochrome rendition of the signal is displayed upon an electronic viewfinder 20 and, at the appropriate time, the color signal is prepared for recording in a record processing section 22. The recording signal is applied to a recording head 24 and recorded upon a magnetic disk 26. The disk 26 is mounted for rotation within a cartridge housing 28, which has an opening that allows the recording head 24 to contact the disk 26 for recording a plurality of concentric tracks (which correspond to a plurality of images). Finally, a timing circuit 30 synchronizes the signal processing section 18, the record processing section 22, and the viewfinder 20, with the image sensor 12. In particular, the timing circuit 30 produces the transfer gate signal XSG, and the phasing signals XV1 ... XV4 and XH.

A number of additional signals are shown in FIG. 1, as follows: A moving aperture signal MA (from the controller 14 to the timing circuit 30) signifies that a shutter button has been pressed for a still exposure and that the optical aperture presented to incoming light is being adjusted by the optical section 10. A start exposure signal SE (from the controller 14 to the timing circuit 30) follows the signal MA and signifies that the aperture is correctly established and a still exposure can begin. An expose field signal EXF1 (from the timing circuit 30 to the controller 14) then indicates that the still exposure indeed has begun. A blanking signal BLK (from the controller 14 to the timing circuit 30) controls the blanking of the electronic viewfinder 20. The recording period is regulated by a record activate signal RAC (from the timing circuit 30 to the record processing section 22). Each of these signals will be further described in connection with FIGS. 3 and 4.

Figure 3A:
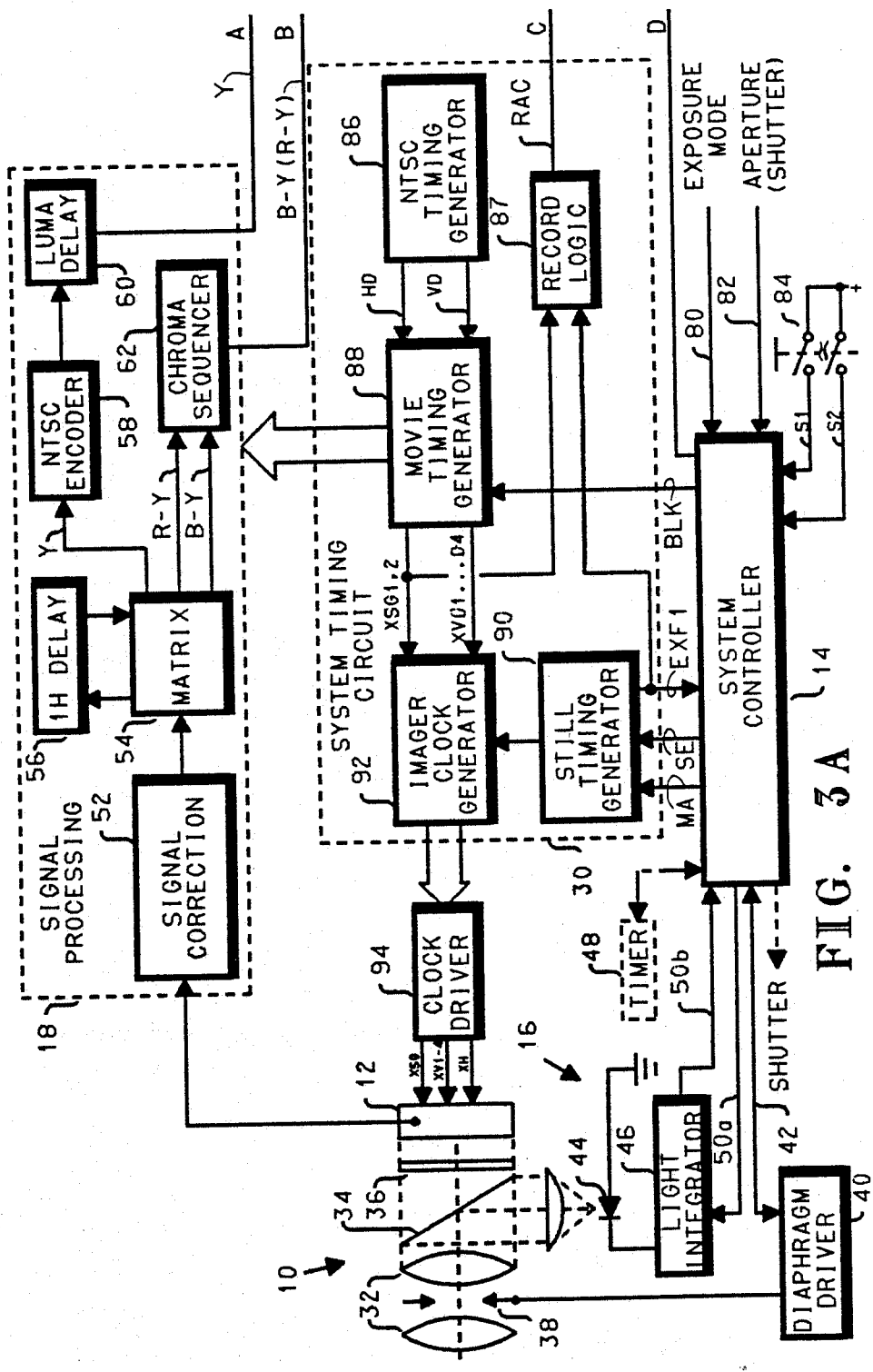
FIGS. 3 (A and B) is a rendition of the block diagram of FIG. 1 in further detail.

Referring to FIG. 3A, the optical section 10 includes a lens system 32 for directing image light from an object (not shown) to the image sensor 12 through a partially transmissive mirror 34 and a color filter 36. A diaphragm 38 regulates the optical aperture (through which image light passes) by a linkage with a diaphragm driver 40. The system controller 14 and the driver 40 communicate with one another on a line 42 when the aperture is to be, or has been, changed. When the camera is first energized, signals on the line 42 direct the driver 40 to drive the diaphragm 38 to an initial known point, such as fully open. After initialization, the system controller 14 continuously monitors, and saves, the aperture value of the diaphragm 38 by combining its previous known aperture setting with the newly calculated setting, as represented by the effect of the present signals being sent to the driver 40 over the line 42. The optical section 10 also interacts with the exposure control circuit 16, which receives a sample of image light diverted by the mirror 34. The exposure control circuit 16, which employs an integration cycle in its exposure determination process, includes a photodiode 44 and a light integrating circuit 46 that cooperate with a timing procedure (shown by a broken-line box 48) in the system controller 14 to arrive at a brightness value of the incoming image light. The light integrator 46 is enabled by the system controller 14 on a line 50a; when the integration cycle is complete, a signal is returned to the controller 14 on a line 50b.

The video signal generated by the image sensor 12 (by application of the aforementioned signals XSG, XV1 ... XV4 and XH) is applied to a signal correction circuit 52, which performs a sample and hold operation and applies gain, white balance and gamma corrections to the signal. The color signal is applied to a matrix 54, which, in combination with a set 56 of 1H delay lines, produces a luminance (Y) signal, and a pair of color difference signals (B-Y, R-Y). The luminance signal is applied to a NTSC encoder 58 and a luma delay stage 60, the latter mainly to account for subsequent color delays in the modulation process. Meanwhile the color difference signals are put in line sequence by a chroma sequencer 62. The luminance signal is tapped at this point (see FIG. 3B) and directed through a monochrome (B/W) signal processing circuit 64 to the electronic viewfinder 20 (which is a conventional monochrome display). The viewfinder display is controlled by conventional vertical and horizontal sweep circuits 66.

The luminance signal and the color difference signals are input to a modulator 68, which provides a selected preemphasis to the input signals and frequency modulates a suitable set of carriers with the preemphasized signals. When permitted by the condition of the record activate signal RAC from the system timing circuit 30, the modulated signal is amplified by a head driver circuit 70 and applied to the recording head 24. The recording portion of the camera includes a disk drive motor 72 for rotating the magnetic disk 26 adjacent the recording head 24. The head 24 is moved by a stepper motor 74 that is connected to a stepper driver circuit 76 controlled from the system controller 14. The disk drive motor 72 is operated at a constant speed by a speed control circuit 78 coupled to the timing circuit 30.

The system timing circuit 30 and the system controller 14 are mutually adapted for the two modes of operation: movie and still. In the movie mode, the exposure time is fixed and the aperture is set to a value determined by the exposure control circuit 16 and the system controller 14. In the still mode, on the other hand, both exposure time and aperture may be varied. One of several conventional exposure modes is selected by designating a unique input to the system controller 14 on a line 80 for the type of mode: for example, aperture-preferred, shutter-preferred, manual, and one or more conventional program modes for emphasizing action photos, for emphasizing depth-of-field, for compromising somewhere between the two preceding modes, and so on. (Methods for calculating the exposure time and/or the aperture value according to these modes are well known from the conventional photographic arts.) Depending on the exposure mode in use, the exposure time and/or aperture value are manually entered to the system controller 14 on line(s) 82. The movie mode is initiated by partially depressing a two-position shutter button 84 to its first position, thereby setting a signal $S_1$ high. the still mode is subsequently selected when the shutter button 84 is fully depressed to its second position and an exposure release signal $S_2$ is set high.

The system control circuit 30 has a free-running circuit component in the form of a NTSC timing generator 86 and a movie timing generator 88, and an intermittently-operated component in the form of a still timing generator 90. The NTSC generator 86 provides a horizontal drive signal HD and a vertical drive signal VD according to NTSC standards. The movie timing generator 88 keys upon the drive signals from the NTSC timing generator 86 and generates a set of transfer gate signals XSG1 and XSG2 for the respective fields of a television frame and a set of four vertical register phasing signals $XV\phi1 \ldots XV\phi4$ for operating the vertical registers of the image sensor (see FIG. 2). The movie timing generator 88 also provides the timing for the signal processing circuit 18, including sample and hold pulses for the signal correction section 52, clamping levels, and so on.

Figure 2:
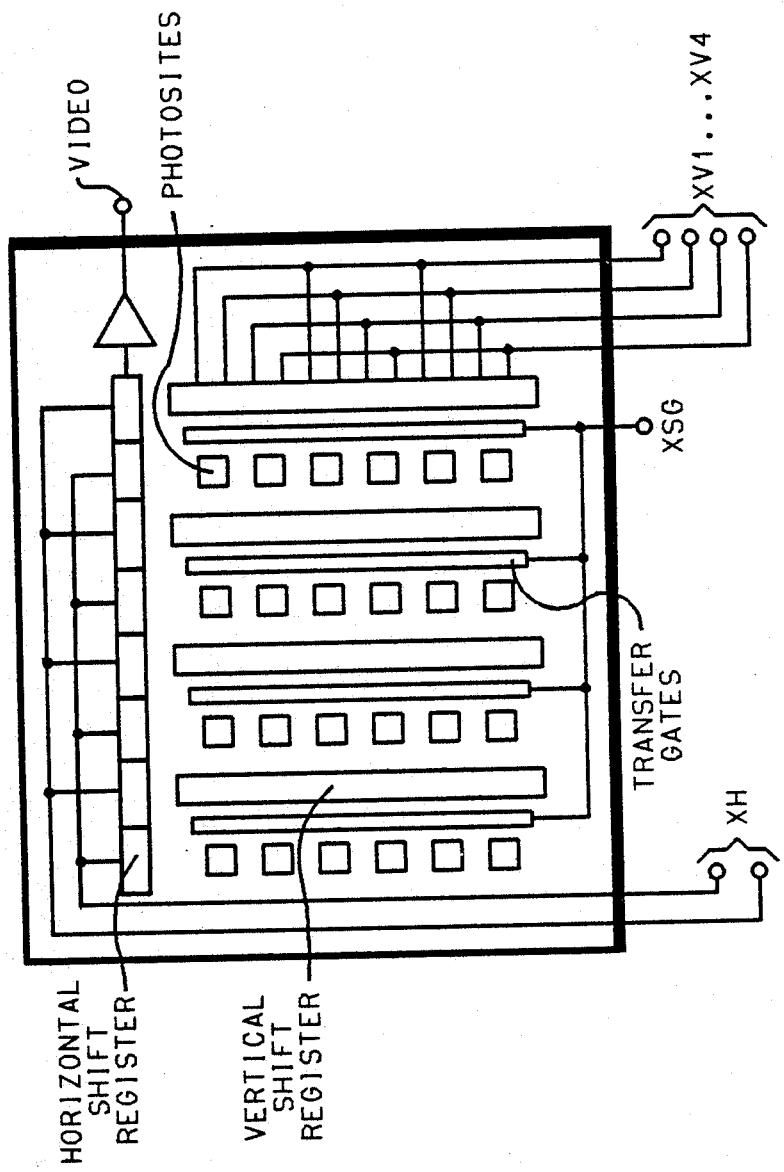
FIG. 2 is an illustration of a conventional interline-transfer imaging device used in the camera of FIG. 1.

An imager clock generator 92 receives input signals from either the movie timing generator 88 or the still timing generator 90 and applies its output to a clock driver 94, which provides the phasing signals XSG, XV1 . . . XV4 and XH to the image sensor 12. The clock generator 92 serves, in the movie mode, as a conduit for the vertical phasing signals $XV\phi1 \ldots XV\phi4$ by transferring them directly to the clock driver 94 and, in the still mode, as a generator of the still timing that defines the still exposure sequence. The field transfer gate signals XSG1 and XSG2 are combined in an OR function by the imager clock generator 92 and, in the movie mode, applied to the clock driver 94 as the transfer gate signal XSG seen in connection with FIG. 2. In the still mode, the XSG signal is independently generated in a preliminary sequence to clear the image sensor 12 of extraneous charge and then to define the still exposure period. Though the XSG signal is shown in FIGS. 1, 2, and 3A as being separately applied to the transfer gates of the image sensor 12, in the preferred embodiment the XSG signal is instead presented as a higher than usual bias level on one of the vertical phasing signals at the moment a transfer is called for; the result . . . the transfer of image charge to the vertical registers . . . is the same for either technique. The imager clock generator 92 and the still timing generator 90, though shown as functionally separate in FIG. 3A, may be combined in one circuit component, such as a programmable logic sequencer.

Figure 3B:
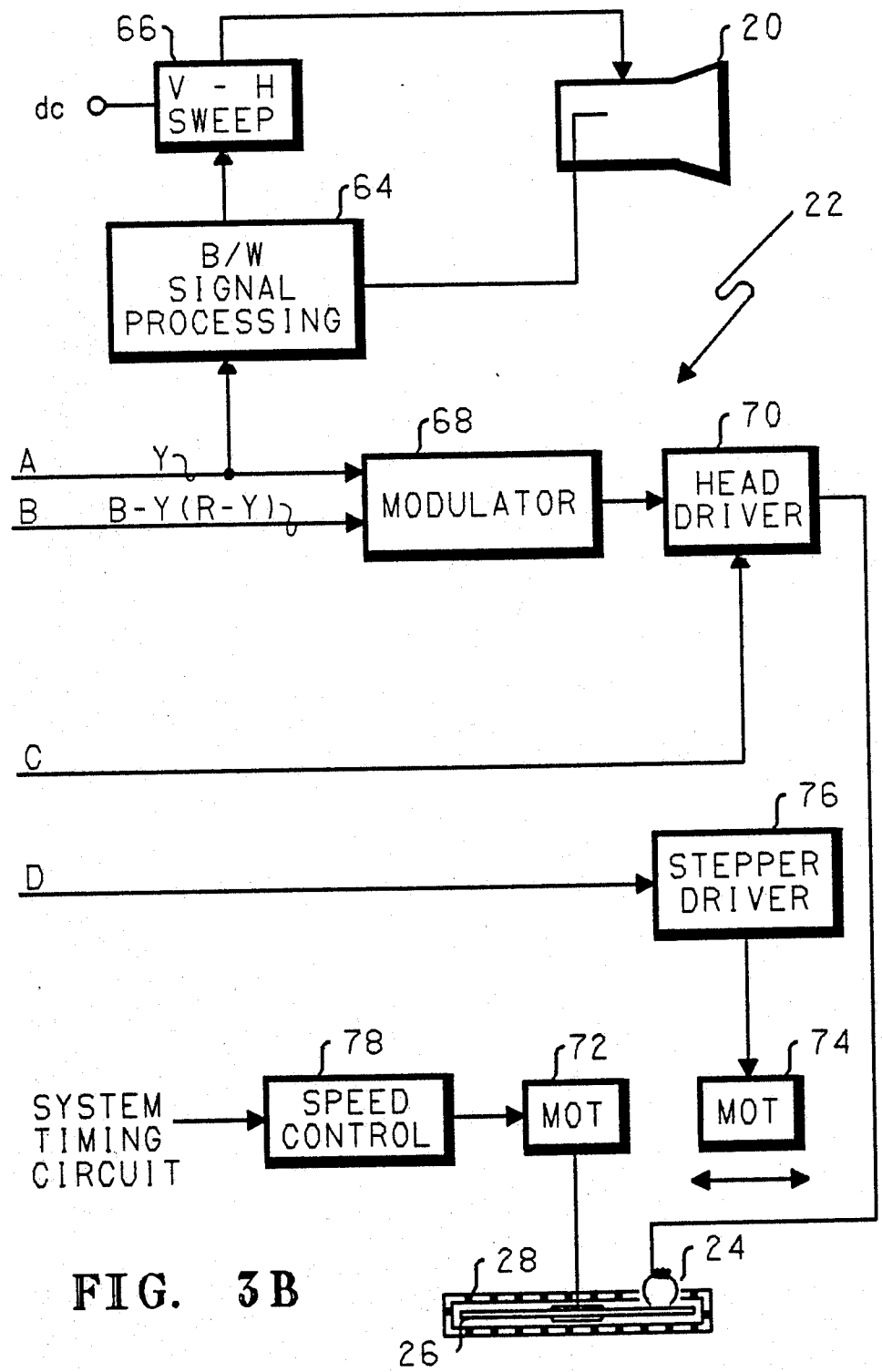
Figure 4:
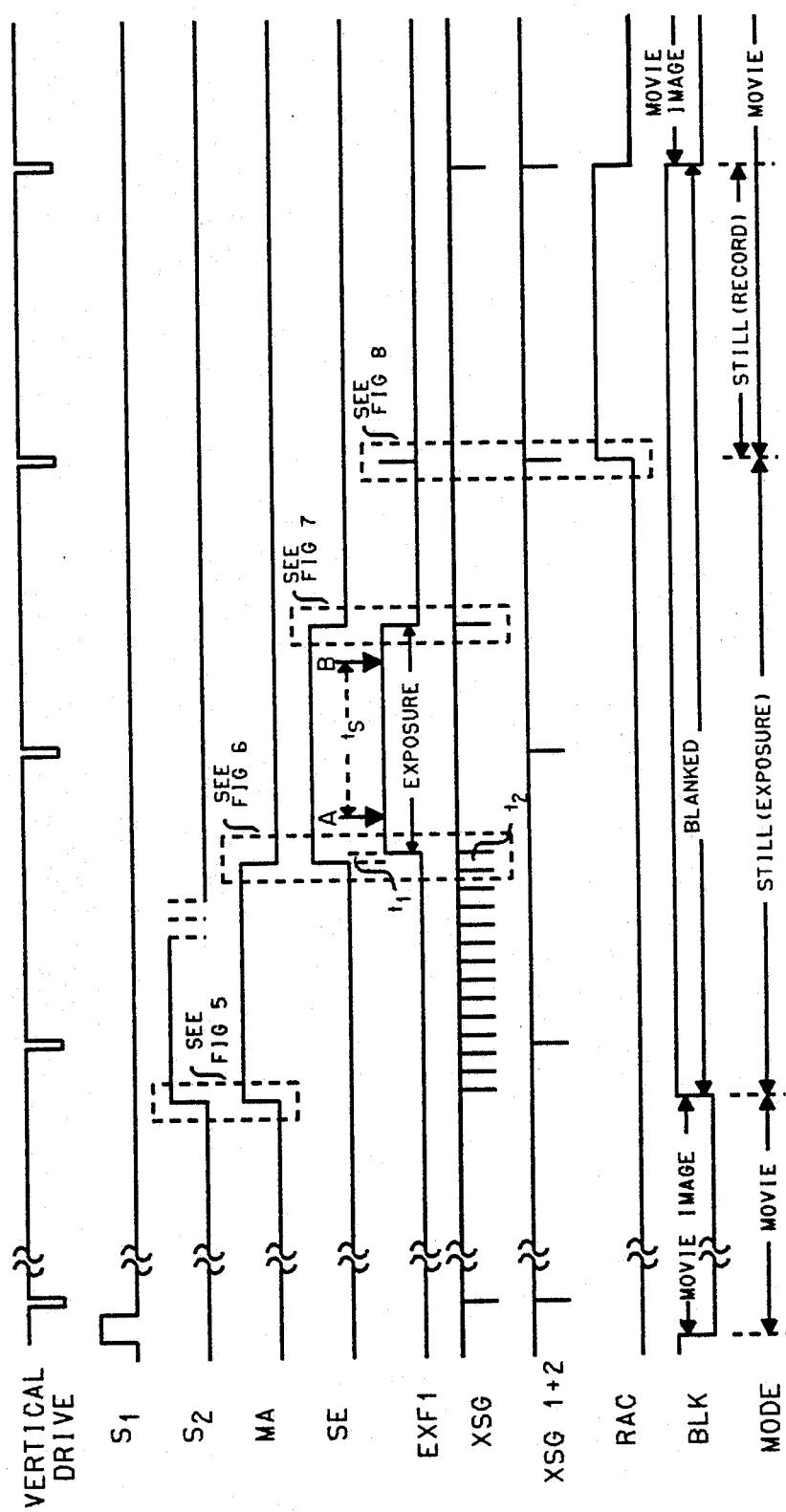
FIG. 4 is a timing diagram describing signal conditions during the operation of the camera shown by FIG. 3.

Referring to FIG. 4 in connection with FIGS. 3A and 3B, when the movie mode is initiated by setting the signal $S_1$ high, the blanking signal BLK from the system controller 14 to the movie timing generator 88 is set low. The movie timing generator 88 accordingly permits the signal processing circuit 18 to pass a video signal to the viewfinder 20. In the movie mode, the timing circuit 30 produces the vertical transfer gate signal XSG for opening the transfer gates of the image sensor according to the vertical drive frequency. Vertical register phasing signals XV1 . . . XV4 and horizontal register phasing signals XH (not shown in FIG. 4) remove the video signal from the image sensor within each field period, applying it to the signal processing section 18 to generate a conventional monochrome video movie display in the viewfinder 20. Meanwhile, the integration period of the exposure control circuit 16 is initiated by a signal on the line 50a and continues until the output of the integrator 46 reaches the level of a reference voltage. For example, the reference voltage is set to correspond to an (average) integration time of 5 milliseconds which, for an average exposure, permits a rapid evaluation of the brightness of the incoming image light . . . in particular, more rapid than the field rate as shown by the vertical drive frequency. Each integration period is measured by the software timer 48 and the actual brightness is determined by the time deviation from an average exposure. Another integration period begins after this one is terminated, and another after the next is terminated, and so on, to form the integration cycle characteristic of the movie mode. An explanation of this integration cycle, which is unnecessary for an understanding of the present invention, can be found in further detail in copending Ser. No. 880,461

Figure 5:
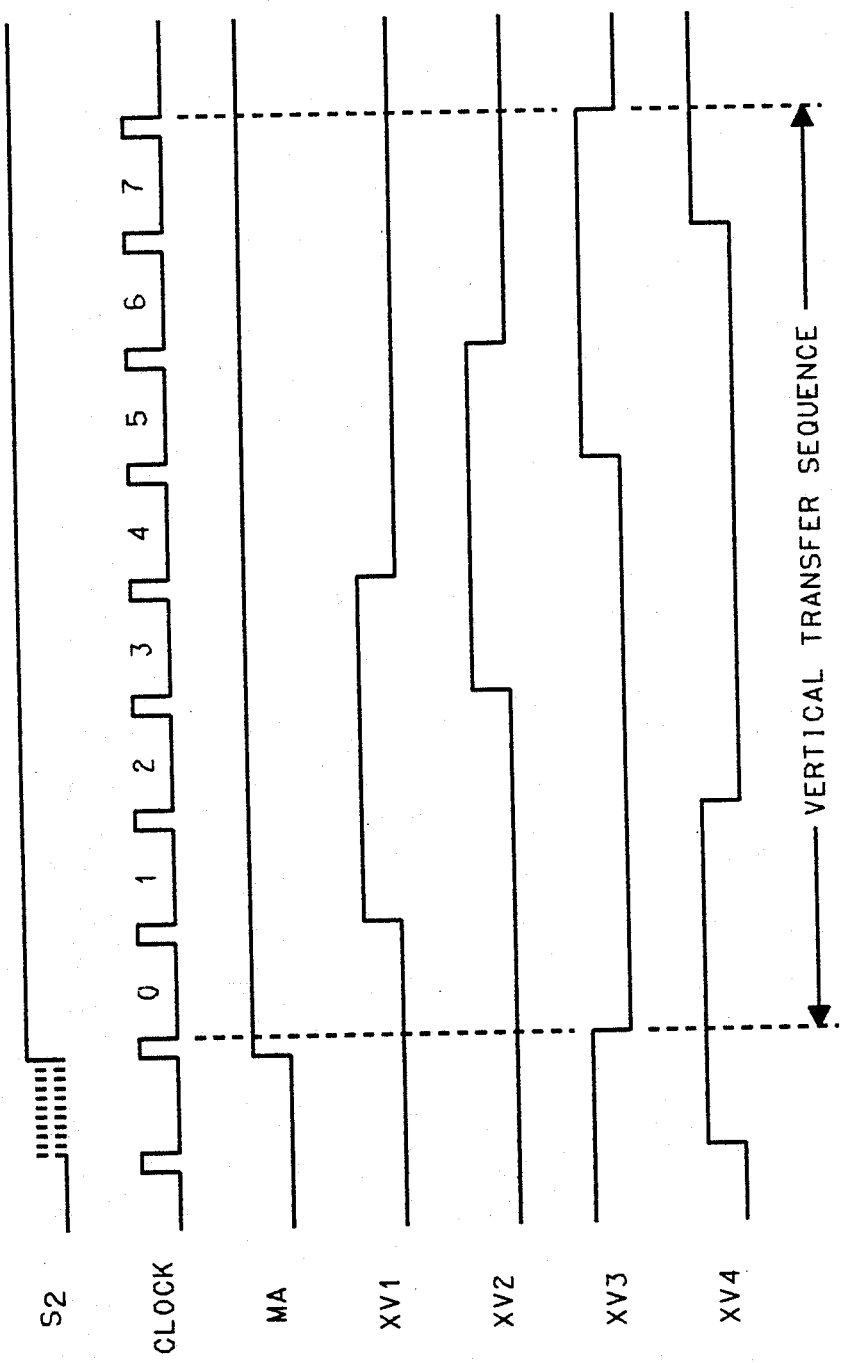
FIG. 5 is a detailed expansion of the beginning of still mode timing as shown by FIG. 4.

The vertical drive signal shown in FIG. 4 determines the video rate for the movie mode of operation. The still mode of operation can be seen from the subsequent waveforms as an interruption of the movie video rate; in particular, both a preliminary sequence of aperture adjustment/sensor clearing and the actual still exposure can be commenced without regard to the vertical drive. The the still mode is initiated in relation to the clock period governing the phase signals XV1 . . . XV4. This clock signal is seen in FIG. 5 as a separate signal that determines the edge transitions of the phasing signals XV1 . . . XV4. The vertical transfer sequence (the time for a potential well to move one increment) is determined by 8 periods of the clock. The signal MA, which begins the still mode sequence, is only recognized on a transition of the clock signal. (The signal MA may in practice be as short as, say, 70 microseconds; it is shown relatively elongated in FIG. 4 for ease of illustration only). Since, in the preferred embodiment, each clock period is 489 nanoseconds, the onset of the signal MA will follow the rising edge of the signal $S_2$ by no more than 489 nanoseconds. (If the exposure release signal $S_2$ went high during a field transfer pulse XSG1 or XSG2, an additional 20 microseconds are allowed before the onset of the signal MA). Nonetheless, the total effective delay is so small as to be negligible to the human user of the camera and, indeed, to the picture-taking function of the camera itself.

With the onset of the signal MA, the signal BLK is set high and the movie timing generator 88 accordingly directs the signal processing circuit 18 to clamp its output signal to a black level. This effectively blanks the viewfinder 40. The system controller 14 issues signals on the line 42 to move the diaphragm to its still aperture value, which was predetermined by operation of the exposure control circuit 16 (see copending Ser. No. 880,461, for more detail). In the meantime the still timing generator 90 has interrupted the imager clock generator 92 and has initiated a rapid-fire sequence of XSG pulses to the transfer gates of the image sensor 12 to clear the photosites of extraneous unwanted charge. From there the charge is cleared by rapid operation of the vertical and horizontal registers. In this connection, the vertical phasing signals XV1 ... XV4 shown by FIG. 5 begin a rapid sequence in which the vertical transfer sequence is considerably shortened, say to 3.9 microseconds, so that each full clearing sequence lasts 1 millisecond. When the aperture is set, a start exposure signal SE can be sent to the timing circuit 30 to indicate that an exposure should commence.

Figure 6:
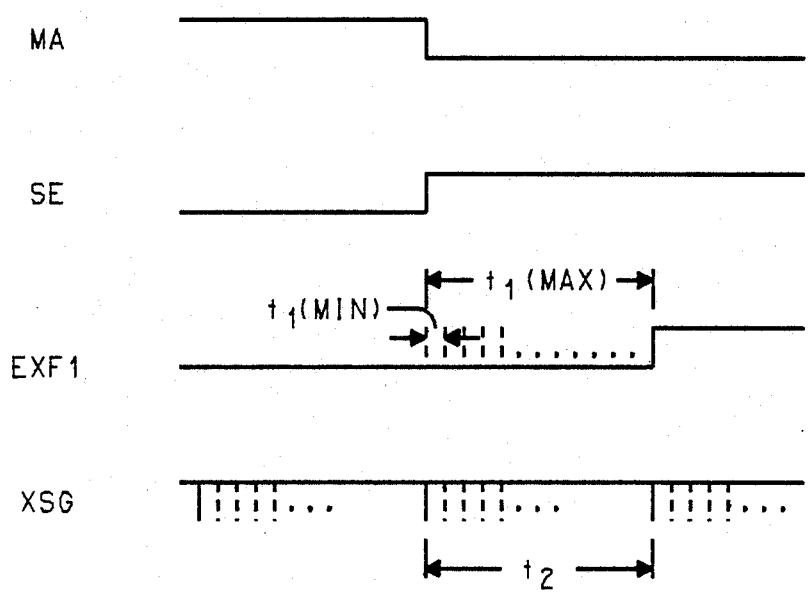
FIG. 6 is a detailed expansion of the beginning of the still exposure period as shown by FIG. 4.

FIG. 6 is a detailed view of the relationship of the start exposure signal SE to the clearing sequence $t_2$. Depending on when the signal XSG is pulsed low, a short time interval $t_1$ elapses before the next clearing sequence is completed following receipt of the signal SE. This time ranges from one clock cycle (489 nanoseconds) to a full clearing sequence (1 millisecond). The time interval $t_1$ terminates with the system timing circuit 30 momentarily dropping the gate signal XSG low one more time to open the image sensor transfer gates. As soon as the transfer gates are closed (XGS is high), the image sensor photosites immediately begin to collect charge from the incident image light and the still exposure period begins. Simultaneously, the timing circuit 30 notifies the system controller 14 with the expose field signal EXF1 that the still exposure has begun. Since there is non-image charge residing in the vertical registers, the phasing signals XV1 ... XV4 are sequenced one more time (at the fast rate) until the vertical registers are fully cleared.

While the signal MA is high the signal on the line 50a is set low so that the exposure circuit 16 does not operate during the pre-exposure clearing sequence. At the instant the expose field signal EXF1 goes high, the signal on the line 50a likewise goes high, thereby beginning the still exposure control integration cycle in synchronism with the still image exposure cycle. The reference voltage provided to the integrator 46 for the still integration cycle is related to the overall exposure required of the image sensor 12 in the still mode. When the integrated voltage equals the level of the reference voltage, the signal on the line 50b changes state, thus notifying the system controller 14 that the exposure should end (the software timer 48 is not used in the still mode). The system controller 14 notifies the timing circuit 30 that the exposure should end by driving the start exposure signal SE low. The transfer gate signal XSG drops low thereby transferring the integrated image charge from the photosites to the vertical registers. Since the vertical registers in a conventional inter-line-transfer device are light-protected by an opaque coating, the image charge is light-protected and the still exposure is terminated. In this connection, it is noteworthy that the clearing sequence $t_2$ is set, in time, to correspond to the fastest exposure time demanded of the camera, i.e., one millisecond, thus insuring that the image charge transfer into the vertical registers never occurs before all extraneous charge is removed therefrom. Though this particular transfer techniques is not essential to the practice of the invention, it is also noteworthy that the use of the vertical registers for charge storage prescribes a camera that processes and records a single video field, rather than a frame.

Figure 7:
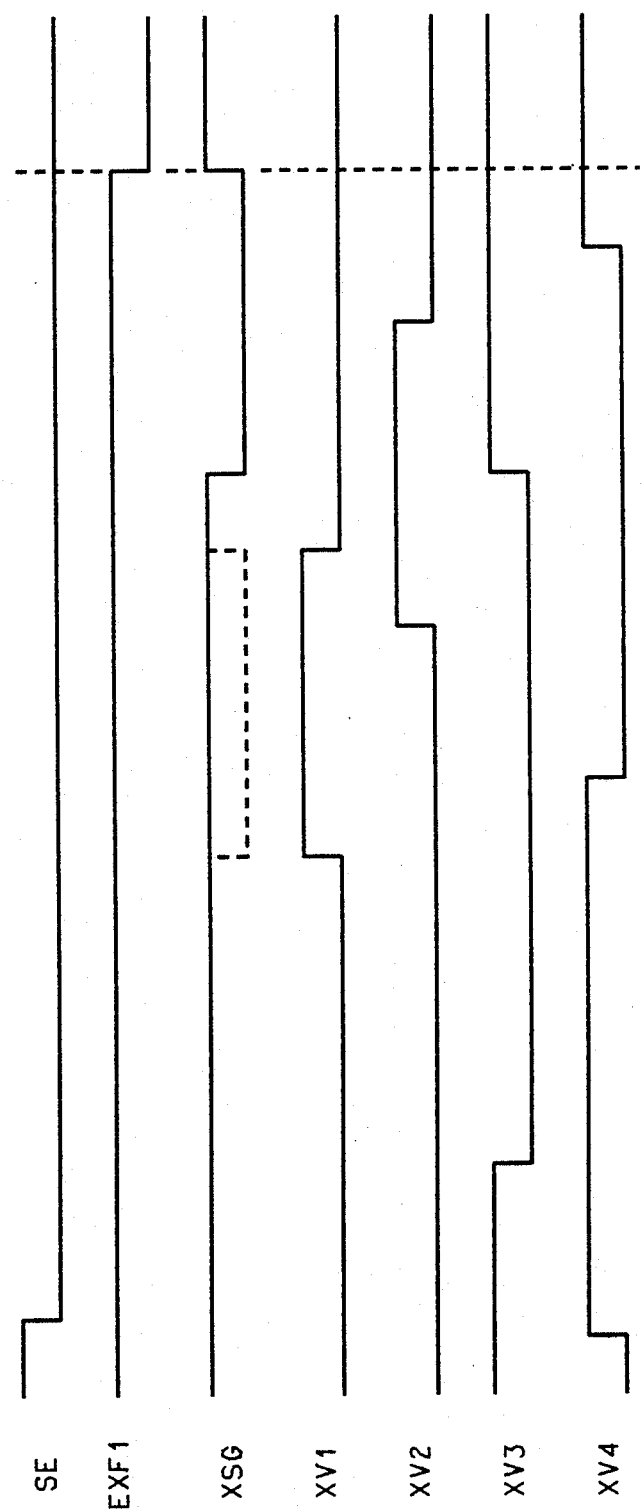
FIG. 7 is a detailed expansion of the end of the still exposure period as shown by FIG. 4.

As shown by FIG. 7, the transfer of the image charge occurs in relation to a transfer sequence of the phasing signals XV1 ... XV4 (which have been static since the last field of extraneous charge was dumped after the still exposure was started). It is necessary for the phases of the vertical phasing signals XV1 ... XV4 to be in a particular state for the transfer back to the movie mode to later occur, as follows:

XV1=low
XV2=low
XV3=high
XV4=high

This phase condition occurs after the lapse of a single vertical transfer sequence (in correspondence with the broken line to the left of FIG. 7). During this sequence, one of the two video fields is transferred ... as shown by either the solid-line pulse or the broken-line pulse in the XSG signal (FIG. 7). The expose field signal EXF1 then drops low, indicating to the system controller 14 that the exposure is over. (The exposure period, i.e., the time that the signal EXF1 is high, is shown to be relatively long in FIG. 4 ... almost a whole field; in practice, it can be as short as 1 millisecond).

Figure 8:
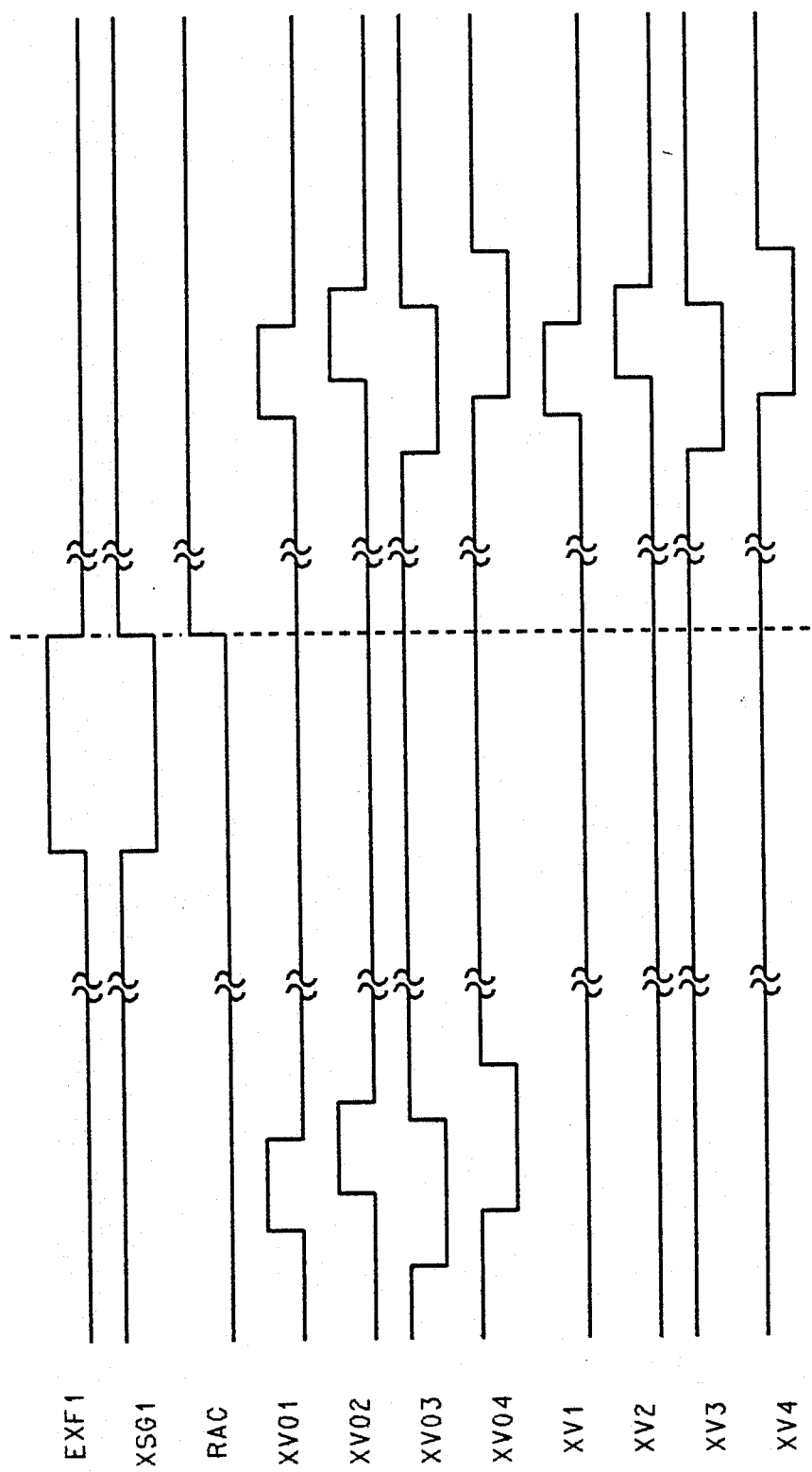
FIG. 8 is a detailed expansion of the portion of FIG. 4 showing the return to the movie mode.

These conditions remain static until the next occurrence of the XSG1 or XSG2 pulse. For this pulse, the transfer gate signal XSG is inhibited since the meaningful image charge in the vertical registers must not be contaminated by residual charge that has accumulated in the photosites since the exposure ended. The transfer of control from the still mode to the movie mode takes place at this time and is shown in more detail in FIG. 8. The vertical transfer clock signals XV$\phi$1 ... XV$\phi$4 have been temporarily interrupted by the imager clock generator 92, which substituted the timing instructions received from the still timing generator 90. Due to the phase synchronization done at the end of the still exposure (see FIG. 7), the vertical transfer clock signals XV1 ... XV4 are presently in the static state shown to the left of the broken line dividing FIG. 8. When the signal XSG1 (or XSG2) is first pulsed low by the movie timing generator 88 after the signal SE has dropped low, the transfer of control is obtained, i.e., the vertical clock signals XV1 ... XV4 are resynchronized to the clock signals XV$\phi$1 ... XV$\phi$4 from the movie timing generator 88. The transfer occurs as shown by FIG. 8 for the signal XSG1; if the signal XSG2 occurs first, the transfer occurs slightly later due to the relative positions of the vertical phasing signals.

Since the signal processing section 18 is driven by the movie timing generator 88 in either mode, the video information is clocked off the imager 12 and processed into a video signal by the circuits making up the section 18. Meanwhile, the concurrence of a XSG1 (or XSG2) pulse and an EXF1 pulse activates a record logic section 87 in the timing circuit 30. The record activate signal RAC is thus set high, which activates the head driver 70, and the still video signal is recorded on the magnetic disk 26. At the occurrence of the next vertical drive interval the transfer gate signal XSG resumes its movie mode of operation and a movie image is displayed on the viewfinder 20, i.e., the signal BLK is set low. (Since the first two fields taken from the image sensor after a still exposure may be over or underexposed due to the continuance of still exposure conditions, it may be preferable to continue blanking the viewfinder 20 for these two fields).

FIG. 4 shows the period from the initiation of the still mode to the beginning of the still exposure as extending over a substantial portion of the vertical drive interval. This is shown mainly for purposes of illustration, since much is happening during this period. In practice, the period may be as short as the system can recognize and utilize. In the preferred embodiment as little as 70 microseconds are allocated to this period (the high state of the signal MA) if the aperture needs no adjustment. Small aperture adjustments require somewhat more time, larger adjustments yet greater time. The origination of the signal MA is keyed to the exposure release signal $S_2$. In certain situations, it may be desirable to allow some time between the signal $S_2$ and the onset of the signal MA. For instance, the controller 14 might not drive the signal MA high until the presently running exposure integration cycle is completed. This feature, described in connection with the cross-referenced copending Ser. No. 880,461, is an optional practice that is unessential to practice of the present invention. Even if used, the benefits of the present invention are obtained since the movie integration cycle is set to occur in less than the time of the vertical interval. Moreover, the onset of the still mode is still initiated in synchronism with the clock period of the phasing signals that drives the image sensor, i.e., it is asynchronous with respect to the vertical drive interval.

The disclosure thus far has been of an "electronically-shuttered" camera, i.e., a camera without a mechanical shutter. If a mechanical shutter is provided, it would preferably be closed at some point after initiation of the still mode and then opened during the still exposure period (when the signal EXF1 is set high). For instance, referring to the waveform for the signal EXF1 in FIG. 4, the mechanical shutter (not shown separately) would be opened during a period $t_s$, which is shown to extend in time from an arrow A to an arrow B comprising a portion of the high cycle of the signal EXF1. The exposure control circuit 16 would be accordingly keyed to the period $t_s$ so as to properly determine the exposure. Using a mechanical shutter means that the light-protected vertical registers on the image sensor 12 would not have to be used to protect the image charge. A full-frame exposure could therefore be made and, while the shutter is closed, each field could be separately clocked off the image sensor 12. The initiation of the still mode and the still exposure period would continue to maintain their asynchronous relation to the vertical drive interval, as heretofore disclosed.

The foregoing disclosure describes a still video camera that maintains the necessary timing synchronization between the movie mode and the still mode of operation without having to delay a still exposure just to "catch up" to some slowly (relatively) running movie reference. By synchronizing the "change-over" to the still mode, and the beginning of the still exposure, to the cyclical character of the image sensor clock signals, rather than to the image repetition frequency, the onset of a still exposure can be made to appear, due to the short times involved, asynchronous with respect to the movie mode. In other words, the camera can, without delay, record a still rendition of the observed scene when the shutter button is pressed.

The invention has been described in detail with particular reference to a presently preferred embodiment, but it will be understood that variations and modifications can be effected within the spirit and scope of the invention. For example, the camera has been especially set up to operate according to NTSC television standards, but it is clear that, with a suitable image sensor and readily implemented changes in the timing circuits, PAL or SECAM standards could be accommodated as well.

What is claimed is:

1. A still video camera of the type having an image sensor that generates a charge pattern in response to image light from an object and operates thereupon either as a signal source for a movie image, according to a specific image repetition rate, or as a signal source for a still image, the camera further including a release switch for initiating a still exposure period, said camera comprising:
   means for generating a continuous stream of movie phasing signals for operating upon the charge in the image sensor at a rate that is substantially greater than the image repetition rate;
   transfer means for applying said movie phasing signals to the image sensor when the image sensor operates as a signal source for a movie image;
   means for generating a still phasing signal for operating the image sensor as a signal source for a still image; and
   means responsive to actuation of the release switch for interrupting the application of said movie phasing signals to the image sensor and for substituting therefor said still phasing signal synchronously with respect to said movie phasing signals and asynchronously with respect to said image repetition rate.

2. The camera as claimed in claim 1 further including:
   means for generating an end exposure signal at the end of the still exposure period; and
   means responsive to said end exposure signal for directing said transfer means to resume application of said movie phasing signals to the image sensor.

3. The camera as claimed in claim 2 in which said movie phasing signals are resumed in synchronism with the image repetition rate.

4. The camera as claimed in claim 3 in which said image sensor is of the type that has one or more light-protected storage elements for temporarily storing the image-wise charge pattern until it can be removed from the sensor, said movie phasing signal generating means initiating the transfer of charge to the storage elements at an image repetition rate corresponding to field intervals, said still phasing signal generating means initiating the transfer of image charge to the storage elements after the end of the still exposure period, and said means responsive to said end exposure signal resuming application of said movie phasing signals at the beginning of a subsequent field interval.

5. A still video camera of the type that includes an electronic viewfinder for previewing a video image of an object and an image sensor that generates a charge pattern in response to image light from the object, said image sensor operating either as a signal source for the viewfinder according to a specific image repetition rate or as a signal source for a still image processed by the camera, the camera further including a diaphragm for regulating the aperture presented to the image light and a release switch for initiating a still exposure period, said camera comprising:

means for generating a continuous stream of movie phasing signals for operating the image sensor according to a specific frequency multiple of the image repetition rate;

means for generating at least one still phasing signal for operating the image sensor as a signal source for a still image;

transfer means for applying either said movie or said still phasing signals to the image sensor when the image sensor operates respectively as a signal source for either the viewfinder or for a still image;

means responsive to actuation of the release switch and initiated in synchronism with said movie phasing signals for setting the diaphragm to a predetermined still aperture;

means responsive to said still phasing signal and to the setting of said predetermined still aperture for initiating the still exposure period;

means for generating an end exposure signal at the end of the still exposure period; and means responsive to said end exposure signal for triggering said transfer means to resume application of said movie phasing signals to the image sensor.

6. The camera as claimed in claim 5 in which said transfer means resumes application of said movie phasing signals to the image sensor in synchronism with the image repetition rate.

7. The camera as claimed in claim 6 in which said image repetition rate corresponds to a video field frequency and said transfer means resumes application of said movie phasing signals to the image sensor in synchronism with the beginning of a video field.

8. A still video camera of the type that includes an electronic viewfinder for previewing a video image of an object and a clocked image sensor having charge-generating photosites and at least one charge-coupled register for transferring image charge from the photosites, said image sensor operating upon the image charge either as a signal source for the viewfinder or as a signal source for a still image processed by the camera, the camera further including a diaphragm for regulating the aperture presented to image light and a release switch for initiating a still exposure period, said camera comprising:

means for generating a high frequency clock signal for operating upon the image charge in the sensor;

movie timing means responsive to said clock signal for generating a low frequency movie driving signal for moving image charge from the photosites of the image sensor to the register in correspondence with a specific image repetition frequency;

still timing means responsive to said clock signal for generating a still driving signal for operating the image sensor during the still exposure period;

control means for engaging either said movie timing means or said still timing means in the operation of the image sensor, said control means having a preview state in which said movie driving signal is passed to the image sensor and a still exposure state in which said still driving signal is passed to the image sensor;

means responsive to actuation of said release switch for engaging said control means in its still exposure state so that control of the image sensor in its still exposure state is initiated in time-dependent relation to the clock period of said clock signal and in substantial time-independent relation to the image repetition frequency;

means for generating an end exposure signal at the end of the still exposure period; and means responsive to said end exposure signal for reengaging said control means in its preview state in time-dependent relation to the image repetition frequency, thereby returning control of the image sensor to said movie timing means.

9. A still video camera that includes an electronic viewfinder for previewing a video image of an object before a still image is processed by the camera, said still video camera comprising:

means for generating a high frequency clock signal;

movie timing means for generating a movie driving signal that is a frequency submultiple of said clock signal;

still timing means for generating a still driving signal that regulates the length of the still exposure;

an image sensor that receives image light from the object and generates a sensor signal therefrom, said image sensor being (a) under control of said movie timing means when operated as a signal source for the viewfinder, said movie driving signal initiating the removal of the sensor signal from said image sensor at set video intervals according to said movie driving signal, and (b) under control of said still timing means when operated as a signal source for the still image;

an exposure release switch for initiating a still exposure;

means responsive to initiation of a still exposure for transferring control of said image sensor from said movie timing means to said still timing means in time-related synchronism with respect to said clocking signal; and means responsive to the end of the still exposure for transferring control of the image sensor back to the movie timing means in time-related synchronism with respect to said movie driving signal.

10. The camera as claimed in claim 9 further including:

a diaphragm for regulating the optical aperture of said image sensor to the image light and wherein said still timing means initially provides a diaphragm-adjusting signal to said diaphragm for setting a predetermined still aperture.

11. The camera as claimed in claim 10 further including:

means responsive to the termination of said diaphragm adjusting signal for beginning the still exposure of the image sensor.

* * * * *